Nov. 6, 1951        H. J. REED, JR        2,574,437

LINEAR DELAY CIRCUIT

Filed March 4, 1946

*INVENTOR.*
HARRY J. REED JR.

BY

ATTORNEY

Patented Nov. 6, 1951

2,574,437

UNITED STATES PATENT OFFICE 2,574,437

LINEAR DELAY CIRCUIT

Harry J. Reed, Jr., West Lafayette, Ind., assignor, by mesne assignments, to the United States of America as represented by the Secretary of the Navy Application March 4, 1946, Serial No. 651,870

5 Claims. (Cl. 250—27)

1

This invention relates to apparatus for producing an adjustable time delay and more particularly to such apparatus which includes a linear sweep circuit and a pickoff combined in a single pentode.

Heretofore a common method for producing a time delay between the occurrence of two events was to produce a sawtooth sweep voltage starting at the time of the first event and to cause the occurrence of the second event when the sawtooth sweep voltage had reached a certain prearranged value. It was customary to make the rise of the sawtooth sweep voltage as linear as possible so that a change in the prearranged pickoff voltage would produce a proportional change in the time delay. This method usually required numerous circuit elements and considerable construction space.

It is an object of this invention to provide apparatus for producing a time delay.

Another object of this invention is to provide apparatus for producing a time delay of predetermined and adjustable length. It is a further object of this invention to provide apparatus for producing a time delay using a minimum of circuit elements and construction space.

These and other objects will become apparent upon consideration of the following description in conjunction with the accompanying drawings in which.

Figure 1:
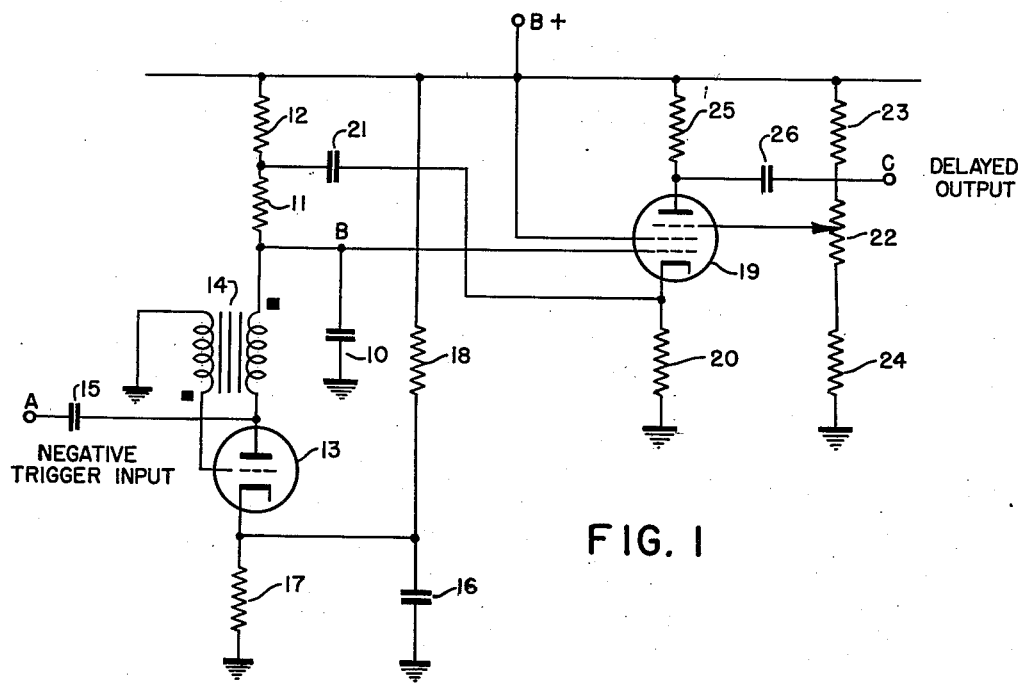
Fig. 1 is a schematic diagram of an embodiment of this invention.

In Fig. 1 is disclosed a linear sawtooth sweep circuit and a means for providing a delayed output at a prearranged time after the beginning of the sawtooth sweep. The linear sawtooth sweep circuit comprises charging capacitor 10 which charges toward B+ voltage through charging resistor 11 and isolating resistor 12. The electronic switch for discharging charging capacitor 10 at the beginning of the sawtooth sweep is a blocking grid oscillator comprising triode 13, pulse transformer 14, input coupling capacitor 15, blocking capacitor 16, and cathode biasing resistors 17 and 18. To improve the linearity of the sawtooth sweep voltage developed across charging capacitor 10 this voltage is introduced in a bootstrap circuit including a pentode 19 having a sharp suppressor grid cut-off characteristic, the three inner elements of pentode 19 being connected as a cathode follower circuit. The output of this cathode follower circuit developed across cathode

2 resistor 20 is fed back through coupling capacitor 21 to the junction between isolating resistor 12 and charging resistor 11. A potentiometer 22 is connected in series with voltage divider resistors 23 and 24 between B+ voltage and ground to provide an adjustable positive voltage for the suppressor grid of pentode 19. The plate of pentode 19 is connected through plate resistor 25 to B+ voltage and the delayed output is taken off the plate of pentode 19 through output coupling capacitor 26.

The blocking grid oscillator which constitutes the electronic switch across charging capacitor 10 in the linear sawtooth sweep circuit is normally cut-off. The grid of triode 13 is grounded through pulse transformer 14 while the cathode is held at a positive voltage above the cut-off voltage by the voltage divider effect of cathode biasing resistors 17 and 18 between B+ voltage and ground. Thus the voltage across charging capacitor 10 is normally equal to the B+ voltage as shown in wave form B of Fig. 2. At time $t_1$ a negative trigger is applied to the plate of triode 13 through capacitor 15 as shown in wave form A of Fig. 2. The negative trigger fires the blocking grid oscillator and effectively short circuits charging capacitor 10 momentarily so that the voltage across it is relatively low at time $t_1$ as shown on wave form B of Fig. 2. After firing at time $t_1$ the blocking grid oscillator is held cut off until another negative trigger input occurs and charging capacitor 10 charges exponentially toward B+ voltage through charging resistor 11 and isolating resistor 12. An exponential rise in voltage across charging capacitor 10 would deviate considerably from a linear rise except at the very beginning of the sawtooth sweep. To improve the linearity of the sawtooth sweep the rising voltage across charging capacitor 10 is fed into the control grid of the cathode follower comprising the three inner elements of pentode 19 and their associated circuit. The cathode voltage of a cathode follower follows changes in the control grid voltage very closely. For this reason the rising cathode voltage is coupled back to the junction between isolating resistor 12 and charging resistor 11. In this way the voltage at each end of charging resistor 11 rises at approximately the same rate during the charging of charging capacitor 10. In other words the voltage across charging resistor 11 is approximately constant and therefore the current through it is approximately constant. Since charging capacitor 10 is in series with charging resistor 11, the current through the former is also approximately constant during its charging period. This will result in a very nearly linear rise in voltage across charging capacitor 10 during its charging period as is evident from the following derivation. The charge on a condenser is given by the following expression:

$$Q = CE \tag{1}$$

where Q is the charge on the condenser, C is the capacitance of the condenser, and E is the voltage across the condenser. A linear voltage rise across the condenser means that the derivative of E with respect to time, t must be constant. Transposing and differentiating Expression 1 gives $$\frac{dE}{dt} = \frac{d\frac{Q}{C}}{dt} = \frac{1}{C} \times \frac{dQ}{dt} = K \tag{2}$$

where K is a constant. By definition, however, the charging current, I, is given by the following expression:

$$I = \frac{dQ}{dt} \tag{3}$$

Therefore, substituting Expression 3 in Expression 2, $$\frac{1}{C}I = K \tag{4}$$

Transposing $$I = CK = K' \tag{5}$$

where K' is another constant. Thus with an approximately constant current through charging capacitor 10 the voltage rise across it will be approximately linear as shown by wave form B of Fig. 2 and the voltage rise at the cathode of pentode 19 will also be approximately linear.

Figure 2:
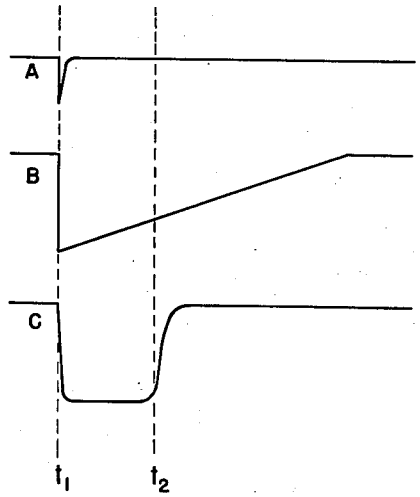
Fig. 2 is a group of voltage wave forms found at various points in the embodiment of this invention shown in Fig. 1.

For any positive voltage on the suppressor grid of pentode 19 determined by the setting of potentiometer 22 the plate current of pentode 19 will be cut off prior to the negative trigger input to the plate of triode 13 as is evident in wave form C of Fig. 2. This follows from the fact that triode 13 is cut off and the voltage across charging capacitor 10 is the B+ voltage making the cathode of pentode 19 more positive than the suppressor grid by more than the suppressor grid cut-off voltage. At the time, $t_1$, of the firing of the blocking grid oscillator, pentode 19 conducts since its cathode is dropped to a voltage well below the suppressor grid voltage. This results in a drop in plate voltage as is apparent in wave form C of Fig. 2. The cathode of pentode 19 then begins its linear rise while the suppressor grid remains at a fixed positive voltage determined by the setting of potentiometer 22. At time, $t_2$, the cathode voltage has risen above the suppressor grid voltage by an amount equal to the suppressor grid cut-off voltage of pentode 19. If pentode 19 has a sharp suppressor grid cut-off characteristic, the plate current will be suddenly cut off and the plate voltage will rise abruptly at time, $t_2$, as shown in wave form C of Fig. 2. The delay occurs between the negative trigger input to the plate of triode 13 and the time of cut-off of the plate current of pentode 19. It is represented as time $t_1 - t_2$ in Fig. 2 and is adjustable in length by means of potentiometer 22 which determines the fixed positive voltage on the suppressor grid of pentode 19 and the time that the rising cathode voltage will overtake the suppressor grid voltage by the amount of the suppressor grid cut-off voltage. The delayed output is coupled off of the plate of pentode 19 by output coupling capacitor 26. The rectangular pulse may be used directly as a gate or it may be differentiated in a resistance capacitance circuit or an inductive circuit to produce a trigger at time $t_2$.

It is obvious that a series of negative triggers may be applied to the plate of triode 13, and a series of outputs will appear at the plate of pentode 19 each of which are delayed a fixed and predetermined amount from the corresponding input trigger depending on the setting of potentiometer 22.

The foregoing description applies to merely one of the simplest embodiments of this invention. The invention is to be limited only by the appended claims.

What is claimed is:

1. Apparatus for providing a variable time delay comprising, a pentode having its three inner elements connected to provide a cathode follower circuit, a circuit associated therewith for producing a rising sweep voltage, said cathode follower circuit being connected back to said associated circuit for improving the linearity of said rising sweep voltage, the suppressor grid of said pentode being connected to an adjustable positive voltage source to produce an output from said pentode delayed from the beginning of said rising sweep voltage by an amount depending on the magnitude of said adjustable positive voltage.

2. Apparatus for providing a variable time delay comprising, a pentode having at least a plate, a cathode and grids and having its three inner elements connected to provide a cathode follower circuit, a circuit for producing a rising sweep voltage the ouput thereof being joined to the input of said cathode follower circuit, the output of said cathode follower circuit being fed back into said sweep voltage circuit to improve the linearity of said rising sweep voltage, the plate of said pentode being connected through a plate resistor to a fixed positive voltage source and the suppressor grid of said pentode being connected to an adjustable positive voltage source, said suppressor grid interrupting current to said plate of said pentode during generation of said rising sweep voltage at a time determined by the magnitude of said adjustable positive voltage, the interruption of said plate current producing an output at said plate delayed from the beginning of said rising sweep voltage.

3. Apparatus for producing a variable time delay comprising, a bootstrap linear sweep circuit including a fixed positive voltage source, a charging condenser being permitted to charge toward said fixed positive voltage, a sharp suppressor grid cut-off pentode, said pentode having at least a plate, a cathode, and a suppressor grid and having its three inner elements connected to form a cathode follower circuit, the rising voltage across said charging condenser being fed back through said cathode follower circuit to increase the rate of said rising voltage and thereby improve the linearity thereof, and a pickoff circuit including the plate and the suppressor grid of said pentode, said plate being connected through a plate resistor to said fixed positive voltage source, said suppressor grid being connected to an adjustable positive voltage source to determine the time of cut off of said plate current, said plate current cut off producing an output at said plate delayed from the beginning of said rising voltage by a time interval dependent upon the magnitude of said adjustable positive voltage.

4. Apparatus for producing a variable time delay comprising, a bootstrap linear sweep circuit including a fixed positive voltage source, a charging condenser, a charging resistor, and an isolating resistor, said charging condenser being permitted to charge through said charging resistor and said isolating resistor toward said fixed positive voltage, a sharp suppressor grid cut-off pentode, said pentode having at least a plate, a cathode, and a suppressor grid and having its three inner elements connected to form a cathode follower circuit, the rising voltage across said charging condenser being fed to the cathode grid of said cathode follower, the rising voltage at the cathode of said cathode follower being fed to the junction between said charging resistor and said isolating resistor to improve the linearity of said rising voltage across said charging condenser, and a pick-off circuit including said pentode, the plate of said pentode being connected through a plate resistor to said fixed positive voltage source, a potentiometer also connected to said fixed voltage source, the suppressor grid of said pentode being connected to said potentiometer to provide an adjustable voltage to said suppressor grid, the adjustment of said potentiometer determining the time of plate current cut-off of said pentode and thereby producing an output at the plate of said pentode delayed from the beginning of said rising voltage at the cathode of said pentode.

5. Apparatus for producing a variable time delay in the occurrence of a voltage pulse comprising, in combination, a saw-tooth wave generator and a cathode follower feedback circuit for improving the linearity of the output of said sawtooth wave generator and for generating a voltage pulse at a variable time following the occurrence of said sawtooth waves, said cathode follower circuit including a pentode having at least a cathode, an anode, a control grid, and a suppressor grid, the output of said sawtooth wave generator being impressed upon said control grid, said cathode being connected back to said sawtooth wave generator, a voltage source, a potentiometer connected to said voltage source, a potentiometer connected to said voltage source, said potentiometer being connected to said suppressor grid and providing an adjustable voltage thereto, output pulses being provided at said anode at a time depending upon the magnitude of said adjustable voltage.

HARRY J. REED, JR.

REFERENCES CITED

The following references are of record in the file of this patent:

UNITED STATES PATENTS

| Number | Name | Date |
|---|---|---|
| 2,232,076 | Newsam | Feb. 18, 1941 |
| 2,398,097 | Kent | Apr. 9, 1946 |
| 2,412,063 | Rosentreter | Dec. 3, 1946 |
| 2,412,064 | Moe | Dec. 3, 1946 |